Jan. 16, 1934.    H. MAYWEG    1,944,097
METHOD OF WELDING
Original Filed Aug. 27, 1930    2 Sheets-Sheet 1

Inventor
Hugo Mayweg,

Jan. 16, 1934.  H. MAYWEG  1,944,097
METHOD OF WELDING
Original Filed Aug. 27, 1930   2 Sheets-Sheet 2

Inventor
Hugo Mayweg,
By Stewart Stewart
Attorneys

Patented Jan. 16, 1934

1,944,097

UNITED STATES PATENT OFFICE 1,944,097

METHOD OF WELDING

Hugo Mayweg, Holzwickede, Germany, assignor to American Welded Tube Company, Brilliant, Ohio, a corporation of Delaware Application August 27, 1930, Serial No. 478,255, and in Germany July 21, 1927. Renewed November 1, 1933

6 Claims. (Cl. 219—10)

This invention relates to the welding of metal parts, and involves continuous welding by a preliminary heating short of fusion followed by a final igneous blast heating to fuse the parts which are then pressed together to complete the weld.

While the present invention is of general application, it is particularly designed for use in the manufacture of tubing by electric welding, especially butt welding.

According to the present invention, all of the well known advantages of the two stage heating are preserved, and in addition thereto the force of the igneous blast is employed to remove scale and other deleterious matter from the face portions which are to be joined together, thereby to provide an improved welded joint, and to enable the welding operations to be carried out while the work is travelling at a relatively high rate of speed so as to materially increase the output in a continuous method of welding.

Figure 1:
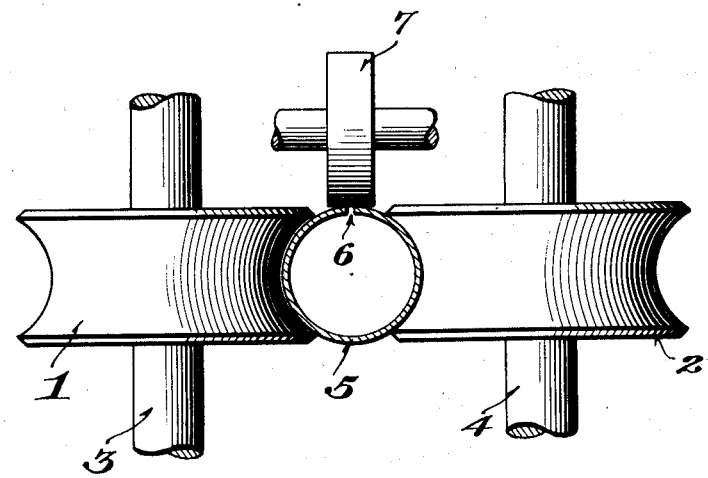
Figure 1 is an end view, looking in the direction of travel of the work piece, of an embodiment of the present invention for electrically welding tubing.
Figure 2:
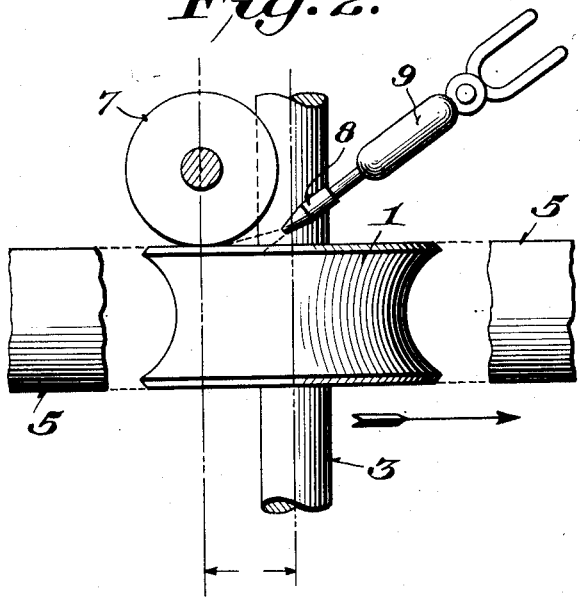
Figure 2 is a side elevation of Figure 1, one of the combined electrode and presser rolls being removed.

In carrying out the present method where the preliminary heating is electrical, a suitable apparatus may be employed including a pair of combined electrode and presser rolls 1 and 2 mounted upon vertical shafts 3 and 4, and provided with concave peripheries spaced so as to define a seat for the reception of the work piece 5 which has been shown in the form of a tube, which has been bent up in a substantially tubular form but with its edges spaced so as to form a longitudinal gap 6 along the top of the tube. It will of course be understood that the tube is bent from a blank into tubular form by any suitable apparatus, not shown, and fed endwise out of the apparatus in between the rolls 1 and 2, which are preferably idle rolls driven by the passage of the tube therebetween in order that there may be perfect synchronism between the tube forming apparatus and the rotation of the electrode rolls 1 and 2 of the welding apparatus.

Disposed in a horizontal position above the plane of the electrode rolls 1 and 2 in a third electrode roll 7 mounted on a horizontal axis and designed to rest by its own weight on the top of the tube so as to engage the latter at opposite sides of the gap 6.

While no electric connections have been shown, it will be understood that the electrode rolls 1 and 2 are of the same polarity, and that the electric current passes between the electrode roll 1 and the electrode roll 7 at one side of the gap 6 and between the electrode roll 2 and the electrode roll 7 on the opposite side of the cap. In other words, the electric current is not passed across the gap.

The edges of the blank which define the gap in the top of the tube are maintained spaced while the tube is passing past the electrode roll 7, the axis of which is in front of the axes of the electrode members 1 and 2, or in other words, in front of the bite of the rolls 1 and 2 so as to insure a preliminary heat, short of fusion, of the edge portions of the blank which define the gap 6.

Figure 3:
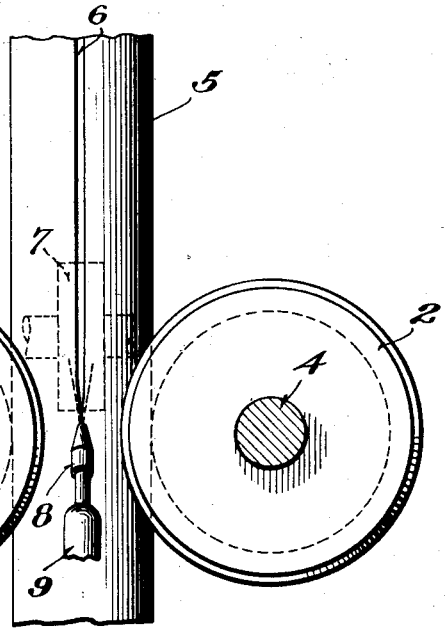
Figure 3 is a top plan view of Figure 1.
Figure 4:
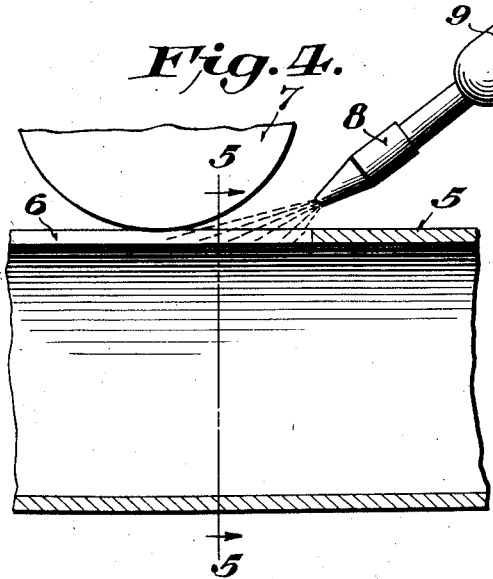
Figure 4 is a detail sectional view, on an enlarged scale, illustrating the disposition of the burner or nozzle of the igneous blast device.
Figure 5:
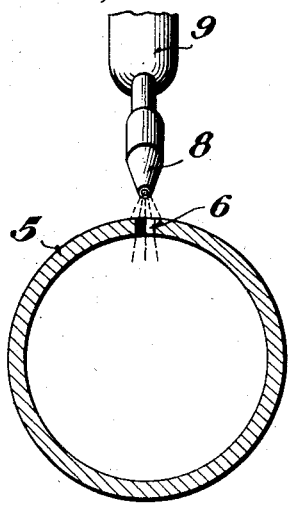
Figure 5 is a sectional view on the line 5—5 of Figure 4.

Disposed in rear of the electrode roll 7 and above the electrode rolls 1 and 2 is the nozzle 8 of an igneous blast device 9, said nozzle being disposed at an angle of about 45° and arranged so as to discharge into the gap 6 in front of the bite of the rolls 1 and 2 and in rear of the axis of the roll 7, thereby to bring the edges of the blank to a fused condition preparatory to being forced together in the bite of the rolls 1 and 2 for the completion of the welded joint. By reference more particularly to Figures 3, 4 and 5 of the drawings, it will be seen that the full force of the blast from the nozzle 8 is had upon the spaced faces of the edges of the blank which define the gap, so that said edges will not only be brought to a fused condition, but scale and other deleterious matter will be blasted from the faces, thereby to provide an improved joint and thereby enabling the carrying on of the welding operation at a relatively high rate of travel of the tube or the work piece so as to materially increase the output of the continuous operation.

What is claimed is:

1. The herein described method of continuous welding, which consists in feeding the work endwise with the parts to be welded in spaced relation, effecting a preliminary electric heating of the edge portions of the spaced parts short of fusion, then directing an igneous blast upon and between the spaced parts to fuse the same and blast off impurities from the spaced parts, and then pressing the fused parts together to complete the welding operation.

2. The herein described method of welding, which consists in arranging the parts to be welded in spaced relation for butt welding, effecting a preliminary electric heating of the spaced edge portions that are to be butt welded and short of fusion, then directing an igneous blast upon and between the face portions of the parts which are to be butt welded to fuse the same and blast off impurities therefrom, and then pressing the fused parts together to complete the welding operation.

3. The herein described method of butt welding the edges of a tubular work piece, which consists in feeding the work piece endwise with the edges in spaced relation, effecting a preliminary electric heating of the edge portions of the work piece short of fusion, then directing an igneous blast upon and between the edges of the work piece to fuse the same and blast off impurities from said edges, and then pressing together the fused edges to complete the welding operation.

4. The herein described method of continuous welding, which consists in feeding the work endwise with the parts to be welded extending longitudinally of the feeding direction and in spaced relation to provide a gap between the parts and extending in the direction of the feed, effecting a preliminary electric heating of the spaced edge portions of the parts short of fusion, thereafter directing an igneous blast into the gap and upon the heated edge portions of the spaced parts to fuse the same and blast off impurities from the spaced edges, and thereafter pressing the fused parts together to complete the welding operation.

5. The herein described method of welding which consists in feeding the work endwise with the parts to be welded in spaced relation and extending in the direction of the feed, subjecting the workpiece to electrodes of opposite polarity spaced longitudinally of the direction of feed to effect a preliminary electric heating of the edge portions of spaced parts short of fusion, directing an igneous blast upon and between the spaced heated edges of the parts to fuse the same and blast off impurities from the spaced parts and in the space between the electrodes, and pressing together the fused parts subsequent to the application of the igneous blast to complete the welding operation.

6. The herein described method of continuous welding, which consists in feeding the work endwise with the parts to be welded extending longitudinally of the feeding direction and in spaced relation to provide a gap between the parts and extending in the direction of the feed, effecting a preliminary heating of the spaced edge portions of the parts short of fusion, thereafter directing an igneous blast into the gap and upon the heated edge portions of the spaced parts to fuse the same and blast off impurities from the spaced edges, and thereafter pressing the fused parts together to complete the welding operation.

HUGO MAYWEG.